(12) United States Patent
Jung et al.

(10) Patent No.: US 9,053,618 B2
(45) Date of Patent: Jun. 9, 2015

(54) PORTABLE TERMINAL HAVING HAPTIC MODULE WITH A HINGE PART SUPPORTING A TOUCH PAD

(75) Inventors: He Won Jung, Ansan-si (KR); Jong Sik Seo, Ansan-si (KR); Yo Sub Kim, Ansan-si (KR)

(73) Assignee: HYSONIC. CO., LTD. (KR)

( * ) Notice: Subject to any disclaimer, the term of this patent is extended or adjusted under 35 U.S.C. 154(b) by 313 days.

(21) Appl. No.: 13/881,238

(22) PCT Filed: Jun. 20, 2011

(86) PCT No.: PCT/KR2011/004479
§ 371 (c)(1),
(2), (4) Date: Apr. 24, 2013

(87) PCT Pub. No.: WO2012/002664
PCT Pub. Date: Jan. 5, 2012

(65) Prior Publication Data
US 2013/0285801 A1     Oct. 31, 2013

(30) Foreign Application Priority Data

Jun. 30, 2010    (KR) .................... 10-2010-0062543

(51) Int. Cl.
| | | |
|---|---|---|
| G08B 21/00 | (2006.01) | |
| G08B 6/00 | (2006.01) | |
| G06F 3/01 | (2006.01) | |
| G06F 3/041 | (2006.01) | |
| H04M 1/02 | (2006.01) | |

(52) U.S. Cl.
CPC *G08B 6/00* (2013.01); *G06F 3/016* (2013.01); *G06F 3/041* (2013.01); *H04M 1/0266* (2013.01); *H04M 2250/22* (2013.01)

(58) Field of Classification Search
CPC ........................................................ G08B 6/00
USPC ................. 340/7.1, 407.2; 178/18.01, 18.03, 178/18.04; 345/173
See application file for complete search history.

(56) References Cited

U.S. PATENT DOCUMENTS

2008/0060856 A1*    3/2008    Shahoian et al. .......... 178/18.03

FOREIGN PATENT DOCUMENTS

| KR | 1020080096854 | 11/2008 |
|---|---|---|
| KR | 100896812 | 4/2009 |
| KR | 1020090125222 | 12/2009 |

OTHER PUBLICATIONS

International Search Report—PCT/KR2011/004479 dated Feb. 23, 2012.

* cited by examiner

*Primary Examiner* — Jeffery Hofsass
(74) *Attorney, Agent, or Firm* — Cantor Colburn LLP

(57) ABSTRACT

A portable terminal having a haptic module, in which a piezoelectric element is mounted on a hinge part elastically supporting a touch pad, includes: a main body; a touch pad which is included in the main body to recognize a touch of a user; a vibration stage which is disposed between the main body and the touch pad and has a hinge part upwardly elastically supporting the touch pad; a piezoelectric element which is mounted on the hinge part, and when power is applied, wrap-deforms the hinge part to generate a vibration on the touch pad. The vibration stage includes a base part connected to the main body. One end of hinge part is integrally connected with the base part and the other end thereof is spaced apart from the base part to be in a state of being free.

6 Claims, 5 Drawing Sheets

A-A

ND HAVING HAPTIC
PORTABLE TERMINAL HAVING HAPTIC MODULE WITH A HINGE PART SUPPORTING A TOUCH PAD

TECHNICAL FIELD

The present invention relates to a portable terminal having a haptic module, and more particularly, to a portable terminal having a haptic module, which provides a feedback function to a touch pad of the portable terminal.

BACKGROUND ART

In a recent interface device, forced or contacted feedback called haptic feedback is provided to a user. A haptic version of, for example, a joystick, a mouse, a game pad, a steering wheel, or other devices can output force to a user on the basis of an interaction or an event occurred in a graphic environment of a game or other application programs.

Meanwhile, a touch pad which is formed into a small square shape and provided at a mobile terminal can sense a position of a pointing object with various sensing techniques, such as a capacitive sensor and a pressure sensor, which sense a pressure applied thereon.

The haptic feedback is also provided at the touch pad of the mobile terminal.

FIG. 1 shows the structure of a conventional mobile terminal with a haptic feedback function.

As shown in FIG. 1, a touch pad 16 is elastically installed at a housing (not shown) of a mobile terminal through a spring 62.

And a piezoelectric actuator 64 is disposed at a lower side of the touch pad 16.

One portion 66 of the piezoelectric actuator 64 is coupled to the touch pad 16, and the other portion 68 thereof is coupled with a weight 70.

And when the one portion 66 of the piezoelectric actuator 64 is moved with respect to the other portion 68 thereof, the weight 70 is moved together with the other portion 68. The weight 70 is moved approximately along a z-axis. Since the weight 70 is not coupled to the housing, it can be moved freely.

The movement of the weight 70 along the z-axis generates an inertial force transmitted to the touch pad 16 through the piezoelectric actuator 64, and the touch pad 16 is moved along the z-axis due to the elastic coupling.

The movement of the touch pad 16 is sensed as a haptic sensation by a user contacted with the touch pad 16.

However, in a conventional haptic actuator 64, since the piezoelectric actuator 64 is operated in the state of being directly installed at the touch pad 16, the haptic feedback is occurred over the whole part of the touch pad 16, there is a limitation in locally implementing the haptic feedback at the touch pad 16, delicately.

DISCLOSURE

Technical Problem

An object of the present invention is to provide a mobile terminal having a haptic module, in which a piezoelectric element is installed at a hinge part elastically supporting the touch pad so as to more delicately operate the haptic feedback provided at the touch pad and also to locally control the haptic feedback implemented at the touch pad.

Technical Solution

To achieve the object of the present invention, the present invention can provide a mobile terminal having a haptic module, comprising a main body; a touch pad which is provided at the main body so as to recognize a user's touch; a vibration stage which is disposed between the main body and the touch pad and provided with a hinge part for elastically supporting the touch pad upwardly; and a piezoelectric element which is disposed at the hinge part so as to deform the hinge part to be bent when electric power is applied.

Preferably, the vibration stage comprises a base part which is connected to the main body; and the hinge part of which one end is integrally connected with the base part and the other end thereof is spaced apart from the base part to be in a state of being free, and an upper end of the hinge part is connected to the touch pad, and a lower end thereof is installed at the piezoelectric element, and the piezoelectric element is contacted and expanded left and right when electric power is applied, such that the hinge part is deformed to be bent.

Preferably, the hinge part is provided in plural and respectively disposed at each vertex of the vibration stage.

Preferably, a first coupling protrusion is formed at the upper end of the hinge part.

Preferably, a suspension part which is connected with the main body so as to elastically support the vibration stage from the main body is provided at the vibration stage.

Preferably, one end of the suspension part is integrally connected to the base part and the other end thereof is spaced apart from the base part so as to be in a state of being free, and the man body is formed with a second coupling protrusion which is coupled to the other end of the suspension part.

Preferably, the mobile terminal further comprises a damping member which is disposed between the vibration stage and the main body so as to prevent a vibration generated in the vibration stage from being transmitted to the main body.

Advantageous Effects

As described above, the haptic module according to the present invention has the effects, as follows:

Since the hinge part is deformed to be bent by the piezoelectric element so as to generate the vibration in the touch pad, while supporting the touch pad, the haptic feedback provided at the touch pad can be delicately operated and also can be locally controlled.

Since the hinge part is deformed to be bent up and down when the piezoelectric element is contracted and expanded, the touch pad is moved up and down, thereby generating the vibration in the touch pad.

Since the hinge portion is provided in plural so as to be disposed at each vertex of the vibration stage, the distance between the hinge portions can be increased as long as possible, and it is prevented that the vibration generated in the touch pad by one hinge part is overlapped with other vibrations generated in the touch pad by another hinge parts, thereby more delicately control the local vibration of the touch pad.

Since the first coupling protrusion is protruded toward the touch pad and then coupled with touch pad, the upper surface of the hinge part is spaced apart from the lower surface of the touch pad, and thus it is prevented that the hinge part is interfered with the touch pad upon the bending deformation of the hinge part.

Since the suspension part elastically supports the vibration stage from the main body, it is minimized that the vibration generated by the hinge part is transmitted to the main body, thereby reducing fatigue of the main body and improving discernment of the haptic feedback.

Since the damping member is provided between the vibration stage and the main body, it is prevented that the vibration generated at the vibration stage is transmitted to the main body, thereby allowing the user to more facilely recognize the haptic feedback of the touch pad.

DESCRIPTION OF DRAWINGS

The above and other objects, features and advantages of the present invention will become apparent from the following description of preferred embodiments given in conjunction with the accompanying drawings, in which.

BEST MODE

Figure 1:
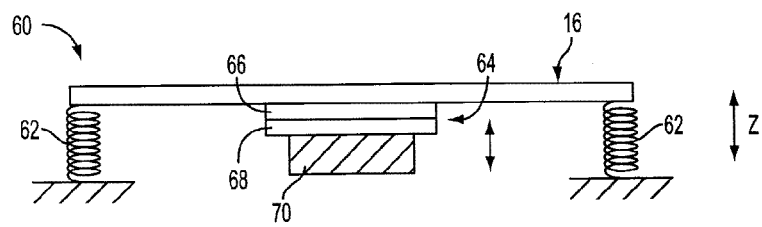
FIG. 1 is a view showing a structure of a conventional touch pad having a haptic feedback function.
Figure 2:
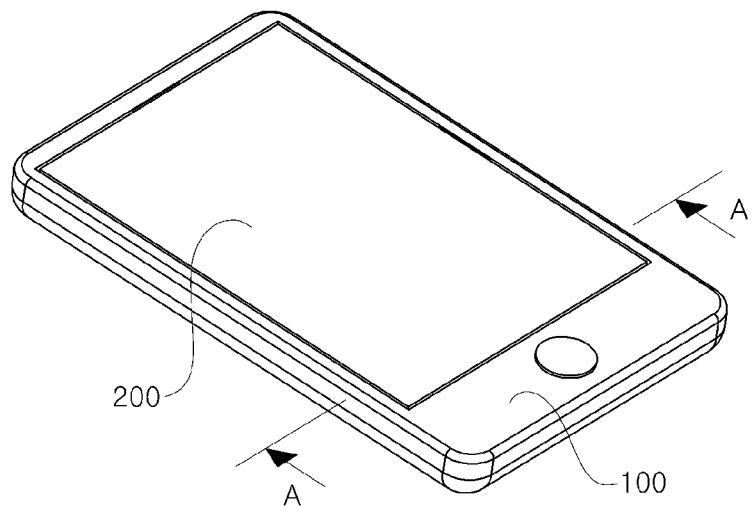
FIG. 2 is a view showing a structure of a mobile terminal having a haptic module according to an embodiment of the present invention.
Figure 3:
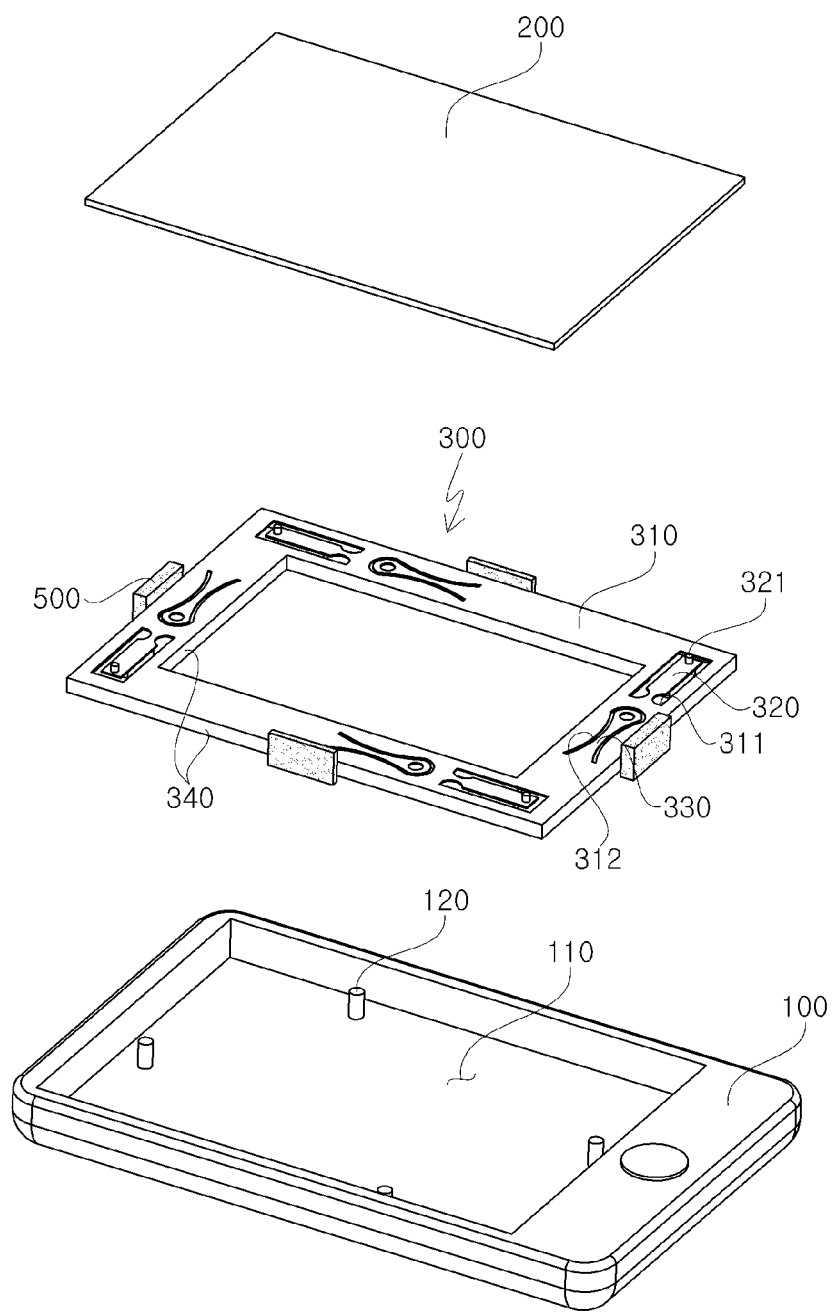
FIG. 3 is an exploded perspective view of the mobile terminal having the haptic module according to the embodiment of the present invention, when seeing in one direction.
Figure 4:
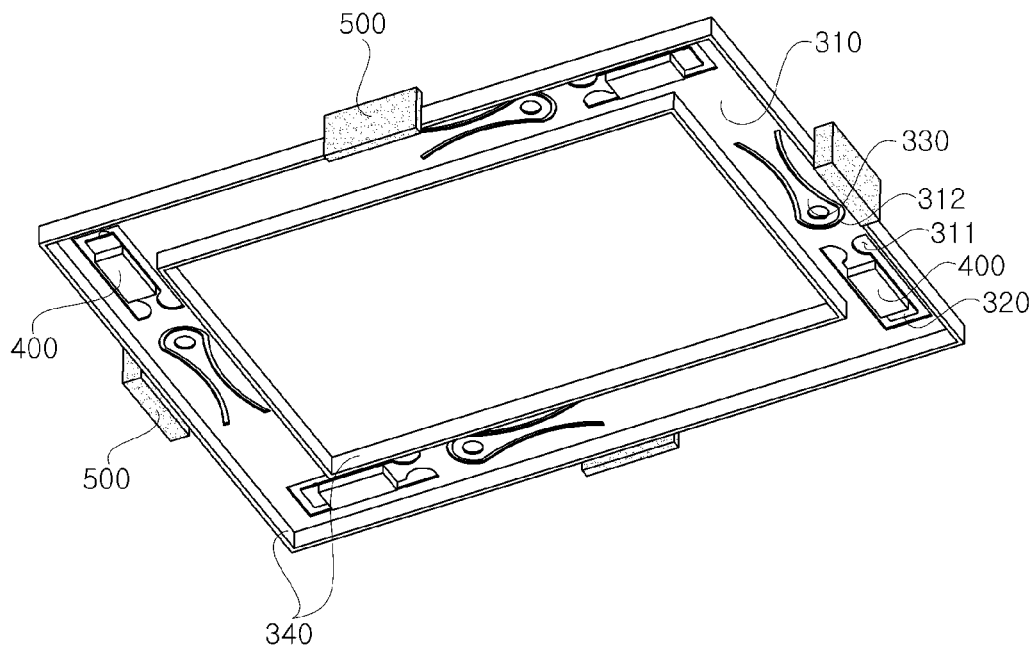
FIG. 4 is an exploded perspective view of a main part of the mobile terminal having the haptic module according to the embodiment of the present invention, when seeing in the other direction.

Hereinafter, the embodiments of the present invention will be described in detail with reference to accompanying drawings.

As shown in FIGS. 2 to 6, a mobile terminal having a haptic module according to an embodiment of the present invention includes a main body 100, a touch pad 200, a vibration stage 300, a piezoelectric element 400 and a damping member 500.

The main body 100 is formed into a flat hexahedral shape in which a control part such as a main board is disposed, although not shown in the drawings.

The control part controls the piezoelectric element 400 and the touch pad 200 on the basis of a signal recognized from the touch pad 200.

A mounting groove 110 is formed into a square shape which is opened upwardly.

Further, a second coupling protrusion 120 is formed in the mounting groove 110 so as to be protruded upwardly.

The second coupling protrusion 120 is formed into a cylindrical shape of which a height is shorter than a depth of the mounting groove 110. Fourth second coupling protrusions 120 are provided and arranged to be spaced apart from each other and to be adjacent to an inner side surface of the mounting groove 110.

The second coupling protrusion 120 functions to support the vibration stage 300 upwardly so that the vibration state 300 is spaced apart from an inner end of the main body 100, which forms the mounting groove 110.

The touch pad 200 is formed into a thin square shape which is inserted into the mounting groove 110. The touch pad 200 functions to recognize a user's touch, output a signal to the control part and output information transmitted from the control part in the form of an image.

A width of the touch pad 200 is formed to be smaller than a width of the mounting groove 110 so that the touch pad 200 is spaced apart from the inner side surface of the main body 100, which forms the mounting groove 110.

The vibration stage 300 is formed into a thin square shape and disposed between the main body 100 and the touch pad 200.

More detailedly, the vibration stage 300 includes a base part 310, a hinge part 320, a suspension part 330 and a rib part 340.

The base part 310 is formed into a rectangular thin plate shape of which a center portion is opened up and down. The base part 310 is inserted into the mounting groove 110.

A width of the base part 310 is formed to be smaller than the width of the mounting groove 110 so that the touch pad 200 is spaced apart from the inner side surface of the main body 100, which forms the mounting groove 110.

The base part 310 is formed with a first through-hole 311 and a second through-hole 312.

The first through-hole 311 is formed into a rectangular shape which is opened up and down. Four first through-holes 311 are provided and disposed at each vertex of the base part 310.

The hinge part 320 is formed at the first through-hole 311.

The second through-hole 312 is formed into a rectangular shape which is opened up and down. Four second through-holes 312 are provided and respectively disposed to be adjacent to each of the first through-holes 311.

The suspension part 330 is formed at the second through-hole 312.

The hinge part 320 is formed into a square shape of which one end is integrally connected with an inner side surface of the base part 310, which forms the first through-hole 311.

Further, the other end of the hinge part 320 is disposed to be spaced apart from the inner side surface of the base part 310, and thus the other end of the hinge part 320 is in a state of being free.

And the hinge part 320 is provided at each first through-hole 311 so as to be disposed at each vertex of the base part 310.

Further, an upper end of the hinge part 320 is contacted with the touch pad 200, and the piezoelectric element 400 is installed at a lower end thereof.

The hinge part 320 has elasticity. Thus, the hinge part 320 can be deformed to be bent up and down about one end thereof by the piezoelectric element 400, thereby generating a vibration in the touch pad 200.

As described above, since the hinge part 320 is deformed to be bent by the piezoelectric element 400 while elastically supporting the touch pad 200, thereby generating the vibration in the touch pad 200, it is possible to more delicately operate the haptic feedback provided at the touch pad 200 and also to locally control the haptic feedback implemented at the touch pad 200.

Further, the hinge part 320 is provided in plural and disposed at each vertex of the vibration stage 300, a distance between the hinge portions 320 can be increased as long as possible, and it is prevented that the vibration generated in the touch pad 200 by one hinge part 320 is overlapped with other vibrations generated in the touch pad by another hinge parts 320, thereby more delicately control the local vibration of the touch pad 200.

Further, a first coupling protrusion 321 coupled to the touch pad 200 is formed at an upper end of the hinge part 320.

The first coupling protrusion 321 is formed into a cylindrical shape which is protruded upwardly and disposed at the other end of the hinge part 320.

The first coupling protrusion 321 is coupled with the touch pad 200 and supports the touch pad 200 so that the touch pad 200 is spaced apart from an upper surface of the hinge part 320.

Since the first coupling protrusion 321 is protruded toward the touch pad 200 and then coupled to the touch pad 200, the upper surface of the hinge part 320 is spaced apart from the lower surface of the touch pad 200, and thus it is prevented that the hinge part 320 is interfered with the touch pad 200 upon the bending deformation of the hinge part 320.

The suspension part 330 is connected with the main body 100 so as to elastically support the vibration stage 300 from the main body 100.

Detailedly, one end of the suspension part 330 is integrally connected with the inner side surface of the base part 100, which forms the second through-hole 312, and the other end thereof is spaced apart from the inner side surface of the base part 100, which forms the second through-hole 312, so as to be in the state of being free.

Further, the suspension part 330 has a concave shape that both side surfaces of the suspension part 330 are concavely curved toward each other.

The suspension part 330 has elasticity. Thus, the suspension part 330 can be deformed to be bent up and down about one end thereof, thereby offsetting the vibration generated at the hinge part 320.

The other end of the suspension part 330 is coupled with the second coupling protrusion 120 so that the vibration stage 300 is spaced apart from an inner end of the main body 100.

As described above, since the suspension part 330 elastically supports the vibration stage 300 from the main body 100, it is minimized that the vibration generated by the hinge part 320 is transmitted to the main body 100, thereby reducing fatigue of the main body 100 and improving discernment of the haptic feedback.

The rib part 340 is protruded downwardly along the outer and inner circumferences of the base part 310.

A height of the rib part 340 is formed to be less than a height of the second coupling protrusion 120, and a lower end of the rib part 340 is disposed to be spaced apart from an end of the main body 100 so as to be not contacted with the end of the main body 100.

Since a thickness of the base part 310 becomes thick due to the rib part 340, the bending deformation of the base part 310 is prevented.

Meanwhile, the piezoelectric element 400 is disposed at a lower end of the hinge part 320 so that the hinge part is deformed to be bent when electric power is applied, thereby generating the vibration in the touch pad 200.

Detailedly, the piezoelectric element 400 is formed into a square shape which is elongated in a length direction of the hinge part 320.

When electric power is applied, the piezoelectric element 400 is contracted and expanded left and right, i.e., in a length direction thereof, such that the piezoelectric element 400 and the hinge part 329 are bent up and down.

Since the piezoelectric element 400 is contracted and expanded left and right so that the hinge part 329 is bent up and down, the touch pad 200 is moved up and down, thereby generating the vibration in the touch pad 200.

The damping member 500 is disposed between the vibration stage 300 and the main body 100, and thus it is prevented that the vibration generated at the vibration stage 300 is transmitted to the main body 100.

More detailedly, the damping member 500 is disposed between the outer side surface of the vibration stage 300 and the inner side surface of the main body 100, which forms the mounting groove 110, so as to be spaced apart from the touch pad 200.

A gel type liquid damping agent is used as the damping member 500. If necessary, various other materials such sponge, rubber and spring, which can absorb shock, can be used.

As described above, since the damping member 500 is provided between the vibration stage 300 and the main body 100, it is prevented that the vibration generated at the vibration stage 300 is transmitted to the main body 100, thereby allowing the user to more facilely recognize the haptic feedback of the touch pad 200.

Hereinafter, a mobile terminal having the haptic module according to the embodiment of the present invention will be described.

Figure 5:
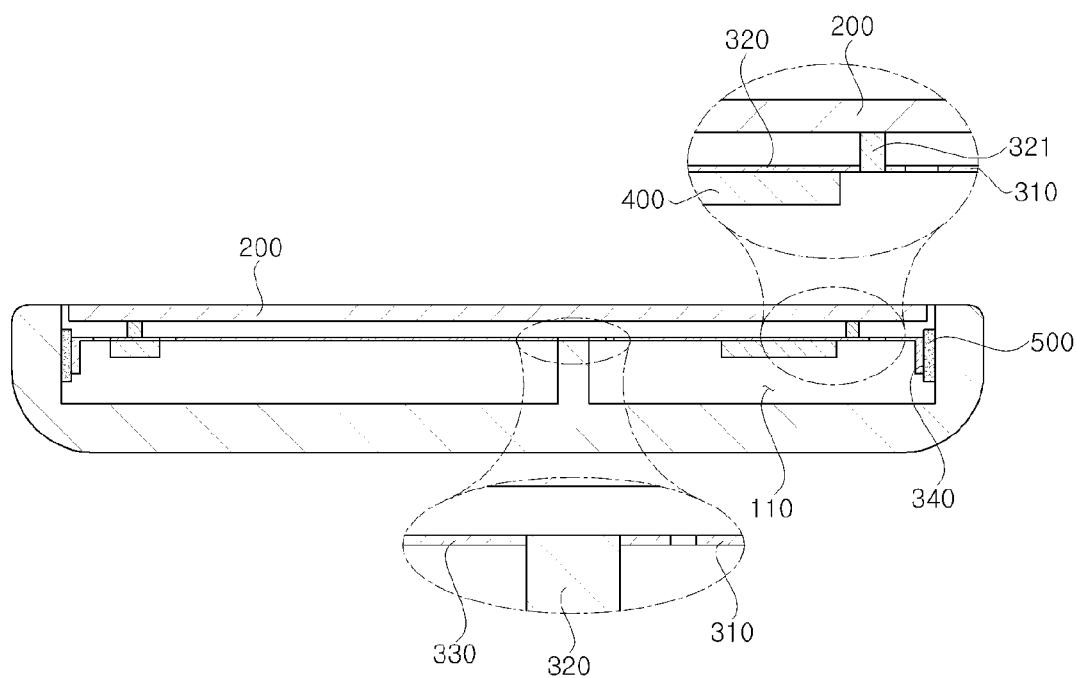
FIGS. 5 and 6 are views showing operation processes of the mobile terminal having the haptic module according to the embodiment of the present invention.

As shown in FIG. 5, before the electric power is applied to the piezoelectric element 400, the hinge part 320 and the suspension part 330 are disposed to be parallel with the base part 310.

If a user touches the touch pad 200, a signal is transferred to the control part, and the control part applies the electric power to the piezoelectric element 400 adjacent to the touched place.

Of course, the control part may apply the electric power to all of the four piezoelectric elements 400 so that the haptic feedback is implemented on the whole parts of the touch pad 200.

Figure 6:
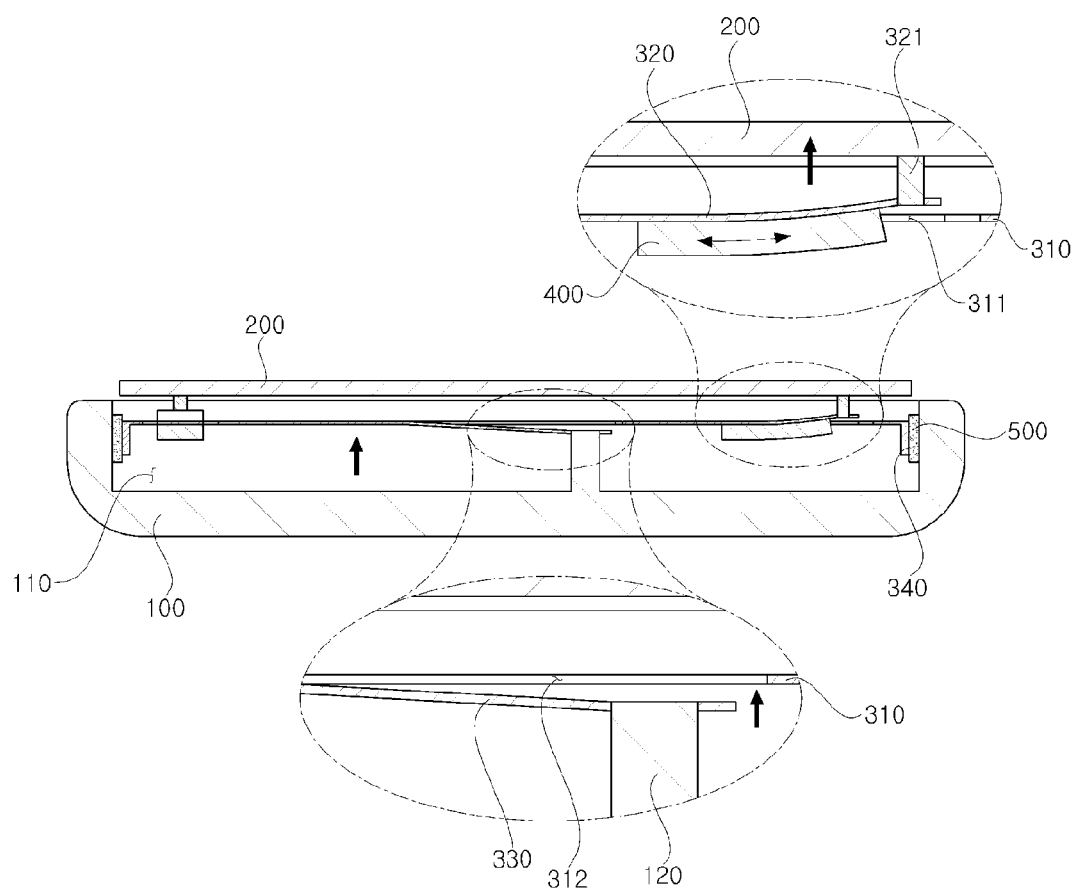

As shown in FIG. 6, if the electric power is applied to the piezoelectric element 400, the piezoelectric element 400 is expanded left and right.

If the piezoelectric element 400 is expanded, the other end of the hinge part 320 which is contacted with the piezoelectric element 400 is bent upwardly while having an increased surface area contacted with the piezoelectric element 400.

The touch pad 200 connected with the first coupling protrusion 321 is moved up by the other end of the hinge part 320.

And if the electric power applied to the piezoelectric element 400 is cut off, the piezoelectric element 400 is contracted left and right, and the hinge part 320 is returned to be parallel with the base part 100 by elastic restoring force.

If the above-mentioned processes are repeated at very high speed, the touch pad 200 is moved fast, thereby generating the vibration.

Further, the vibration of the hinge part 320 is transmitted to the base part 310.

That is, when the hinge part 320 is vibrated, the base part 310 is vibrated while being moved up and down by inertia force.

Herein, as shown in FIG. 6, since the suspension part 330 is coupled with the second coupling protrusion 120, the suspension part 330 is deformed to be bent up and down by the up and down movement of the base part 310, thereby offsetting the vibration.

As described above, since the hinge part 320 elastically supports the touch pad 200 and is deformed to be bent, thereby generating the vibration in the touch pad 200, it is possible to more delicately control the haptic feedback provided at the touch pad 200 and also to locally control the haptic feedback implemented in the touch pad 200.

INDUSTRIAL APPLICABILITY

As described above, since the hinge part is deformed to be bent by the piezoelectric element so as to generate the vibration in the touch pad, while supporting the touch pad, the haptic feedback provided at the touch pad can be delicately operated and also can be locally controlled.

While the present invention has been described with respect to the specific embodiments, it will be apparent to those skilled in the art that various changes and modifications may be made without departing from the spirit and scope of the invention as defined in the following claims.

The invention claimed is:

1. A mobile terminal having a haptic module, comprising:
a main body;
a touch pad which is provided at the main body so as to recognize a user's touch;
a vibration stage which is disposed between the main body and the touch pad and provided with a hinge part for elastically supporting the touch pad upwardly; and
a piezoelectric element which is disposed at the hinge part so as to deform the hinge part to be bent when electric power is applied,
wherein the vibration stage comprises a base part which is connected to the main body; and
wherein one end of the hinge part is integrally connected with the base part and the other end thereof is spaced apart from the base part to be in a state of being free; an upper end of the hinge part is connected to the touch pad, and a lower end thereof is installed at the piezoelectric element; and the piezoelectric element is contacted and expanded left and right when electric power is applied, such that the hinge part is deformed to be bent.

2. The mobile terminal according to claim 1, wherein the hinge part is provided in plural and respectively disposed at each vertex of the vibration stage.

3. The mobile terminal according to claim 1, wherein a first coupling protrusion is formed at the upper end of the hinge part.

4. The mobile terminal according to claim 1, wherein a suspension part which is connected with the main body so as to elastically support the vibration stage from the main body is provided at the vibration stage.

5. The mobile terminal according to claim 4, wherein one end of the suspension part is integrally connected to the base part and the other end thereof is spaced apart from the base part so as to be in a state of being free, and the man body is formed with a second coupling protrusion which is coupled to the other end of the suspension part.

6. The mobile terminal according to claim 1, further comprising a damping member which is disposed between the vibration stage and the main body so as to prevent a vibration generated in the vibration stage from being transmitted to the main body.

* * * * *